(12) United States Patent
Nabar et al.

(10) Patent No.: US 8,634,489 B1
(45) Date of Patent: Jan. 21, 2014

(54) SYSTEMS FOR SELECTING A MODULATION CODING SCHEME

(75) Inventors: Rohit U. Nabar, Sunnyvale, CA (US); Hongyuan Zhang, Fremont, CA (US); Arul Durai Murugan Palanivelu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/465,571

(22) Filed: May 7, 2012

Related U.S. Application Data (63) Continuation of application No. 12/131,768, filed on Jun. 2, 2008, now Pat. No. 8,175,181.

(60) Provisional application No. 60/941,101, filed on May 31, 2007.

(51) Int. Cl.
*H04L 1/02* (2006.01)
*H04J 3/16* (2006.01)

(52) U.S. Cl.
USPC .......................................... 375/267; 370/437

(58) Field of Classification Search
USPC .................... 375/260, 267, 242, 254, 262; 455/226.1, 67.11, 115.1; 370/252, 437, 370/462, 465
See application file for complete search history.

(56) References Cited

U.S. PATENT DOCUMENTS

| | | | | |
|---|---|---|---|---|
| 7,020,073 B2 * | 3/2006 | Kadous et al. | | 370/208 |
| 7,120,199 B2 * | 10/2006 | Thielecke et al. | | 375/267 |
| 7,680,206 B2 * | 3/2010 | Tujkovic et al. | | 375/267 |
| 7,751,493 B2 | 7/2010 | Niu et al. | | |
| 8,077,796 B2 * | 12/2011 | Qi et al. | | 375/285 |
| 2003/0039317 A1 * | 2/2003 | Taylor et al. | | 375/295 |
| 2006/0256848 A1 | 11/2006 | Medvedev et al. | | |
| 2007/0183529 A1 * | 8/2007 | Tujkovic et al. | | 375/267 |
| 2009/0116571 A1 | 5/2009 | Imai et al. | | |
| 2009/0116589 A1 * | 5/2009 | Zhang et al. | | 375/341 |
| 2011/0122971 A1 | 5/2011 | Kim et al. | | |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC)and Physical Layer (PHY) specifications, *The Institute of Electrical and Electronics Engineers, Inc.*, (1999).

(Continued)

*Primary Examiner* — Khanh C Tran (57) ABSTRACT

A computer-readable memory tangibly stores a plurality of instructions that, when executed by one or more processors, cause the one or more processors to determine an indication of modulation constrained capacity of a multiple input multiple output (MIMO) communication channel. The indication of modulation constrained capacity corresponds to one modulation scheme from a plurality of modulation schemes. The instructions also cause the one or more processors to compare the indication of modulation constrained capacity corresponding to the one modulation scheme to a threshold corresponding to the one modulation scheme, and to select a modulation scheme from the plurality of modulation schemes based on the comparison of the indication of modulation constrained capacity to the threshold.

27 Claims, 7 Drawing Sheets

(56) References Cited

OTHER PUBLICATIONS

IEEE Std 802.11a-1999 (Supplement to IEEE Std 802.11-1999) "Supplement to IEEE Standard for Information Technology—Telecommunications and information exchange between systems—Local and metropolitan area networks—Specific requirements—Part 11: Wiereless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11-1999 (Supplement to ANSI/IEEE Std 802.11, 1999 Edition) "Supplement to IEEE Standard for Information Technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.5 GHZ Band," *The Institute of Electrical and Electronics Engineers, Inc.*, 1999.

IEEE Std 802.11b-2001 (Corrigendum to IEEE Std 802.11b-1999) "IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 Ghz band-Corrigendum 1," *The Institute of Electrical and Electronics Engineers, Inc.*, Nov. 7, 2001.

IEEE Std 802.11g/D2.8, May 2002 (Supplement to ANSI/IEEE Std 802.11, 1999 Edition) "Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specificaitons: Further Higher-Speed Physical Layer Extension in the 2.4 GHz Band," *The Institute of Electrical and Electronics Engineers, Inc*, May 2002.

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, Apr. 1, 2003.

IEEE Std 802.11 g/D8.2, Apr. 2003 (Supplement to ANSI/IEEE Std 802.11, 1999 (Reaff 2003)) "Draft Supplement to Standard [for] Information Technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANs, TGn Sync Proposal Technical Specification," *The Institute of Electrical and Electronics Engineers, Inc.*, doc.: IEEE 802.11-04/80889r6, May 2005.

\* cited by examiner

SYSTEMS FOR SELECTING A MODULATION CODING SCHEME

CROSS-REFERENCES TO RELATED APPLICATIONS

The present application is a continuation application of U.S. application Ser. No. 12/131,768, now U.S. Pat. No. 8,175,181, entitled "Method and Apparatus for Selecting a Modulation Coding Scheme," filed on Jun. 2, 2008, which claims the benefit of U.S. Provisional Patent Application No. 60/941,101, entitled "Fine Alphabet Capacity (FAC) Based Method for MCS Selection," filed on May 31, 2007. The disclosures of the above-referenced applications are hereby incorporated by reference herein in their entireties.

FIELD OF TECHNOLOGY

The present disclosure relates generally to wireless communication systems and, more particularly, to an apparatus and method for selecting an appropriate modulation coding scheme for a multiple-input, multiple-output wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technology is described in detail in the 802.11 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

The transmitters and receivers in the wireless communication system may each be capable of using a variety of modulation schemes. For example, some modulations schemes may provide a higher bit rate than other schemes (e.g., 64-QAM vs. 16-QAM). Typically, modulation schemes that provide a higher bit rate may be more sensitive to channel impairments as compared to modulation schemes with a lower bit rate. For example, transmission in an impaired channel using 64-QAM may result in a high error rate, which in turn leads to the need for more parity information and/or the need for the retransmission of information. On the other hand, transmission in the same channel using 16-QAM may result in a lower error rate, which in turn leads to an overall higher throughput rate as compared to transmission at 64-QAM (when needed parity and retransmission are taken into account). Thus, a transmitter may select a particular modulation scheme based on the quality of the channel. This is done typically based on a measure such as a bit error rate.

SUMMARY

In one embodiment, a computer-readable memory tangibly stores a plurality of instructions that, when executed by one or more processors, cause the one or more processors to determine an indication of modulation constrained capacity of a multiple input multiple output (MIMO) communication channel. The indication of modulation constrained capacity corresponds to one modulation scheme from a plurality of modulation schemes. The instructions also cause the one or more processors to compare the indication of modulation constrained capacity corresponding to the one modulation scheme to a threshold corresponding to the one modulation scheme, and to select a modulation scheme from the plurality of modulation schemes based on the comparison of the indication of modulation constrained capacity to the threshold.

In another embodiment, a system includes a memory storing a plurality of thresholds corresponding to a plurality of modulation schemes, and a controller configured to determine an indication of modulation constrained capacity of a multiple input multiple output (MIMO) communication channel. The indication of modulation constrained capacity corresponds to one modulation scheme from the plurality of modulation schemes. The controller is also configured to compare the indication of modulation constrained capacity corresponding to the one modulation scheme to a threshold of the stored plurality of thresholds. The threshold corresponds to the one modulation scheme. The controller is further configured to select a modulation scheme from the plurality of modulation schemes based on the comparison of the indication of modulation constrained capacity to the threshold. The system also includes a signal modulator configured to modulate information signals using the selected modulation scheme to produce modulated signals.

DETAILED DESCRIPTION

Techniques for selecting a modulation coding scheme or modulation coding set (MCS) are described hereinafter. While the MCS selection techniques described herein are described as being used in communication systems that use one of the IEEE Standard 802.11x communication standards, these techniques may be used in various other types of wireless communication systems and are not limited to those conforming to one or more of the IEEE 802.11x standards. More generally, the MCS selection techniques may be utilized in multiple-input-multiple-output (MIMO) communication systems, including those that utilize OFDM modulation. One example of such a system is a system that conforms to the IEEE Standard 802.16, often referred to as WiMAX.

Figure 1:
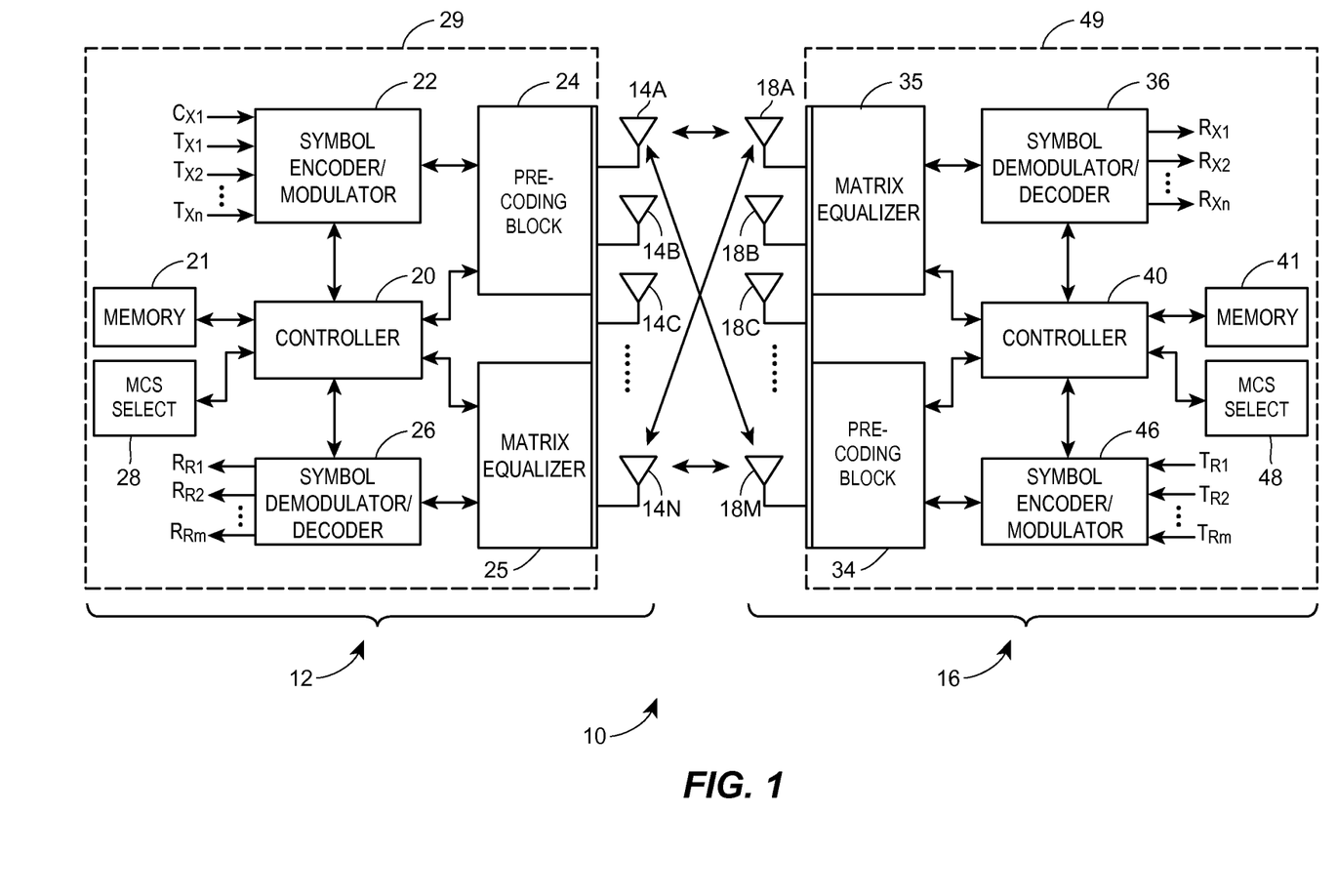
FIG. 1 is a block diagram of a wireless MIMO communication or transmission system that implements a modulation coding set (MCS) selection.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a precoding block 24. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a modulation coding set (MCS) selection unit 28. The controller 12 may be any desired type of controller and both the controller 12 and the MCS selection unit 28 may be implemented as one or more standard multi-purpose, programmable processors, such as micro-processors, as application specific integrated circuits (ASICs), etc., or may be implemented using any other desired types of hardware, software and/or firmware. Likewise, the precoding block 24 and the matrix equalizer 25 may be implemented using known or standard hardware and/or software elements. If desired, various of the transmitter components, such as the controller 20, the modulator unit 22, the demodulator unit 26, the MCS selection unit 28, the precoding block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be a sounding packet, one or more fields in a preamble, etc.

The symbol encoder and modulator unit 22 may interleave digital representations of the various signals $T_{x1}$-$T_{xn}$ and $C_{x1}$ and may be capable of performing a plurality of error correction encoding techniques, which may include known type(s) of error correction encoding, on the signals $T_{x1}$-$T_{xn}$ and $C_{x1}$ to produce one or more streams of symbols to be modulated and sent from the transmitter 12 to the receiver 16. The symbol encoder and modulator unit 22 may be capable of modulating the symbols using a plurality of different modulations techniques, such as different quadrature amplitude modulation (QAM) techniques (e.g., 64-QAM, 16-QAM, 4-QAM, etc.) and/or any other suitable modulation technique (such as other known modulation techniques). The particular encoding technique and the particular modulation technique utilized by the symbol encoder and modulator unit 22 may be determined by, or based on an output of, the MCS selection unit 28. In any event, the modulated symbol stream(s) are provided by the symbol encoder and modulator unit 22 to the precoding block 24 for processing before being transmitted via the antennas 14A-14N. While not specifically shown in FIG. 1, the modulated symbol stream(s) may be up-converted to the RF carrier frequencies associated with an OFDM technique (in one or more stages) before being processed by the precoding block 24. Upon receiving the modulated stream(s), the precoding block 24 processes the modulated stream(s) by injecting delays and/or gains and/or phase rotations into the modulated signals based on a precoding matrix. The precoding matrix may be generated by the precoding block 24 or a block separate from the precoding block 24 such as the controller 20 or a precoding matrix generator (now shown). Application of the precoding matrix to the modulated symbol streams by the precoding block 24 may implement precoding for a single user, precoding for multiple users, single stream beamforming, etc., via the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (e.g., sounding packet, preamble fields, etc.). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may be capable of implementing a plurality of error correction encoding techniques and a plurality of modulation techniques similar to the symbol encoder and modulator unit 22 of the transmitter 12. The particular encoding technique and the particular modulation technique utilized by the symbol encoder and modulator unit 22 may be determined by, or based on an output of, the MCS selection unit 48. The symbol encoder and modulator unit 46 may receive one or more signals $T_{R1}$-$T_{Rm}$ and may encode and modulate the one or more signals $T_{R1}$-$T_{Rm}$. The encoded and modulated symbol stream(s) may then be upconverted and processed by a precoding block 34 to perform precoding based on a precoding matrix. The precoding matrix may be generated by the precoding block 34 or a separate block such as the controller 40 or a precoding matrix generator (not shown). The precoding block 34 may apply the precoding matrix to the encoded and modulated symbol stream(s) prior to the stream(s) being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. The matrix equalizer 25 applies an equalizer matrix that enhances the separation and therefore the reception of the various signals transmitted by the antennas 18A-18M. Of course, the CSI for the various OFDM channel(s) may be used to develop the precoding matrices used by the precoding blocks 24, 34. As noted above, the CSI, precoding and other programs and data such as the precoding matrices used by the units 24 and 34 and by the controllers 20 and 40, may be stored in the memories 21 and 41.

As is generally known, precoding typically includes applying appropriate phases and gains to the various signals as sent through the multiple transmitter antennas 14A-14N. If precoding is to implement beamforming, the applied gains and phases cause the signals sent from the different transmitter antennas 14A-14N to constructively interact (add in phase) in certain predetermined directions and to deconstructively interact (cancel) in other directions. Thus, beamforming typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement precoding in the transmitter 12, a precoding matrix may be determined for any particular frequency channel of the MIMO system 10 based on the CSI determined for that channel (wherein the CSI is usually developed by and sent from the receiver 16 but may instead be developed from signals sent from the receiver 16 to the transmitter 12 in the reverse link as an estimate of the forward link). Of course, developing the precoding matrix may be performed in any desired manner and location. For example, any of the components within the transmitter 12 or within the receiver 16 of FIG. 1, including the controllers 20, 40 and the precoding blocks 24, 34, or some other blocks not illustrated in FIG. 1, may generate and/or process the precoding information. For example, the controller 20 or the precoding block 24 within the transmitter 12 may determine the precoding matrix for use by the precoding block 24 for performing beamforming to the receiver 16. On the other hand, the controller 40 or the precoding block 34 within the receiver 16 may determine the steering matrix for use in the precoding block 24 of the transmitter 12, and may then transmit this steering matrix to the transmitter 12.

The receiver 16 may compute the precoding matrix to be used by the transmitter 12 based on the CSI developed by the receiver 16, and may send the actual precoding matrix to the transmitter 12 to be used in transmitting information to the receiver 16. On the other hand, the precoding matrix for the precoding block 24 of FIG. 1 may be calculated by the transmitter 12 based on the CSI provided and sent back from the receiver 16 to the transmitter 12. As another alternative, the steering matrix for the precoding block 24 of FIG. 1 may be calculated by the transmitter 12 based on the CSI associated with the reverse channel (i.e., from the receiver 16 to the transmitter 12).

Although the precoding blocks 24, 34 were discussed with reference to FIG. 1 as implementing beamforming, the precoding blocks 24, 34 may be capable of implementing one or more of beamforming, spatial multiplexing, and transmit diversity techniques. For example, the precoding blocks 24, 34 optionally may not be capable of implementing beamforming, but rather be capable of implementing one or both of spatial multiplexing and transmit diversity. As another example, the precoding blocks 24, 34 optionally may be capable of implementing beamforming, spatial multiplexing, and transmit diversity.

As discussed above, determination of the precoding matrix used by the precoding block 24 may be based on CSI for the forward channel (i.e., the channel from the transmitter 12 to the receiver 16). The CSI for the forward channel may be determined by the receiver 16 and then the receiver may transmit the CSI for the forward channel back to the transmitter 12. Alternatively, the CSI for the forward channel may be determined by the transmitter 12. For example, the transmitter 12 may determine the CSI for the reverse channel (i.e., the channel from the receiver 16 to the transmitter 12), and then determine the CSI for the forward channel based on the CSI for the reverse channel. For instance, the transmitter 12 may assume that the CSI for the forward channel is the same as the CSI for the reverse channel, or may apply a correction to or otherwise process the CSI of the reverse channel to generate the CSI for the forward channel.

As will be described in more detail below, signal-to-noise ratio (SNR) information for the forward channel may be utilized by the selection unit 28 and/or the MCS selection unit 48 to select a modulation coding set (MCS) for the forward channel. The forward channel SNR information may be determined in a variety of ways. For example, as is known, the forward channel SNR information may be calculated from the CSI for the forward channel. Thus, the MCS selection unit 28 may determine an MCS for the forward channel based on the SNR information for the forward channel, which in turn may be based on the CSI for the forward channel. Similarly, the MCS selection unit 48 may determine an MCS for the forward channel, and then the receiver 16 may transmit the selected MCS to the transmitter 12. In this implementation, the transmitter 12 may merely accept the MCS received from the receiver 16 as the MCS to be utilized, or the transmitter 12 may treat the MCS received from the receiver 16 as merely a suggested MCS. If the transmitter 12 treats the MCS received from the receiver 16 as a suggested MCS, the MCS selection unit 24 of the transmitter 12 may perform its own independent MCS determination and/or further analyze the suggested MCS received from the receiver 16, and then generate an MCS to be utilized by the symbol encoder and modulator 22.

If it is assumed that Gaussian coding and maximum likelihood detection at the receiver is utilized, the maximum error-free transmission rate (C) supported by an additive white Gaussian noise (AWGN) channel can be represented as:

$$C = \log_2(1 + SNR) \qquad \text{(Equation 1)}$$

where SNR is the signal-to-noise ratio of the AWGN channel. But Gaussian coding and maximum likelihood detection is not typically used in communication systems such as WLAN systems. Thus, the maximum error-free transmission rate supported by AWGN channels in practice is typically lower than specified in Equation 1.

Another measure of capacity of a channel is referred to as modulation constrained capacity or finite alphabet capacity (FAC). FAC is an indication of a maximum error-free transmission rate supported by AWGN channel for a given modulation scheme (and, like the maximum capacity measure of Equation 1, assumes maximum likelihood detection at the receiver is utilized). A single-input, single-output (SISO) channel communication system can be modeled as:

$$Y = X + N \quad \text{(Equation 2)}$$

where X is the transmitted signal (drawn from an M-ary finite alphabet constellation, i.e., M is the modulation order of a particular modulation scheme), N is additive white Gaussian noise, and Y is the received signal. The FAC (or $C_{FAC}$, in units of bits per second per Hertz (bps/Hz), for example) for the SISO channel can be represented as:

$$C_{FAC} = h(X) - h(X|Y) \quad \text{(Equation 3)}$$

where h(X) is the differential entropy of X, or the uncertainty in X, and h(X|Y) is the differential entropy of X given Y, or the uncertainty in X given Y. The term h(X) generally indicates the maximum capacity corresponding to the particular modulation scheme (with modulation order M), and the term h(X|Y) generally indicates a reduction or loss in capacity due to the particular channel conditions. Equation 3 can be rewritten as:

$$C_{FAC} = \log_2 M - E_{X,Y}\left\{\log_2\left(\frac{1}{p(X/Y)}\right)\right\} \quad \text{(Equation 4)}$$

where the first and second terms of Equation 4 correspond to the first and second terms, respectively, of Equation 3. The operator $E_{X,Y}\{f(X,Y)\}$ is the expected value of the function $f(X,Y)$ with respect to the variables X and Y, and p(X|Y) is the probability of X given Y. Equation 4 can be rewritten as:

$$C_{FAC} = \log_2 M - E_{X,Y}\left\{\log_2\left(\frac{\sum_Z P(Y/Z)}{p(Y/X)}\right)\right\} \quad \text{(Equation 5)}$$

If it is assumed that the noise is zero-mean complex-Gaussian distributed, then:

$$P(Y = y | Z = z) = \frac{1}{\pi\sigma^2} e^{\frac{|y-x|^2}{\sigma^2}} \quad \text{(Equation 6)}$$

where $\sigma^2$ is the variance of the noise.

Bit-interleaved coded modulation (BICM) is utilized in the IEEE 802.11x standards. As is known, the capacity for BICM is different than Equation 5 (information unit is a bit rather than an M-ary symbol), thus Equations 4 and 5 can be modified to incorporate the maximum capacity corresponding to the particular modulation scheme utilized with BICM. On the other hand, Equations 4 and 5 provide a good approximation for the capacity of BICM and may be utilized as is even if BICM is utilized. Additionally, although Equations 3-6 were described in the context of a SISO channel, one of ordinary skill in the art will recognize that these equations can be readily extended in a straightforward fashion to provide analogous equations for a MIMO channel.

Figure 2:
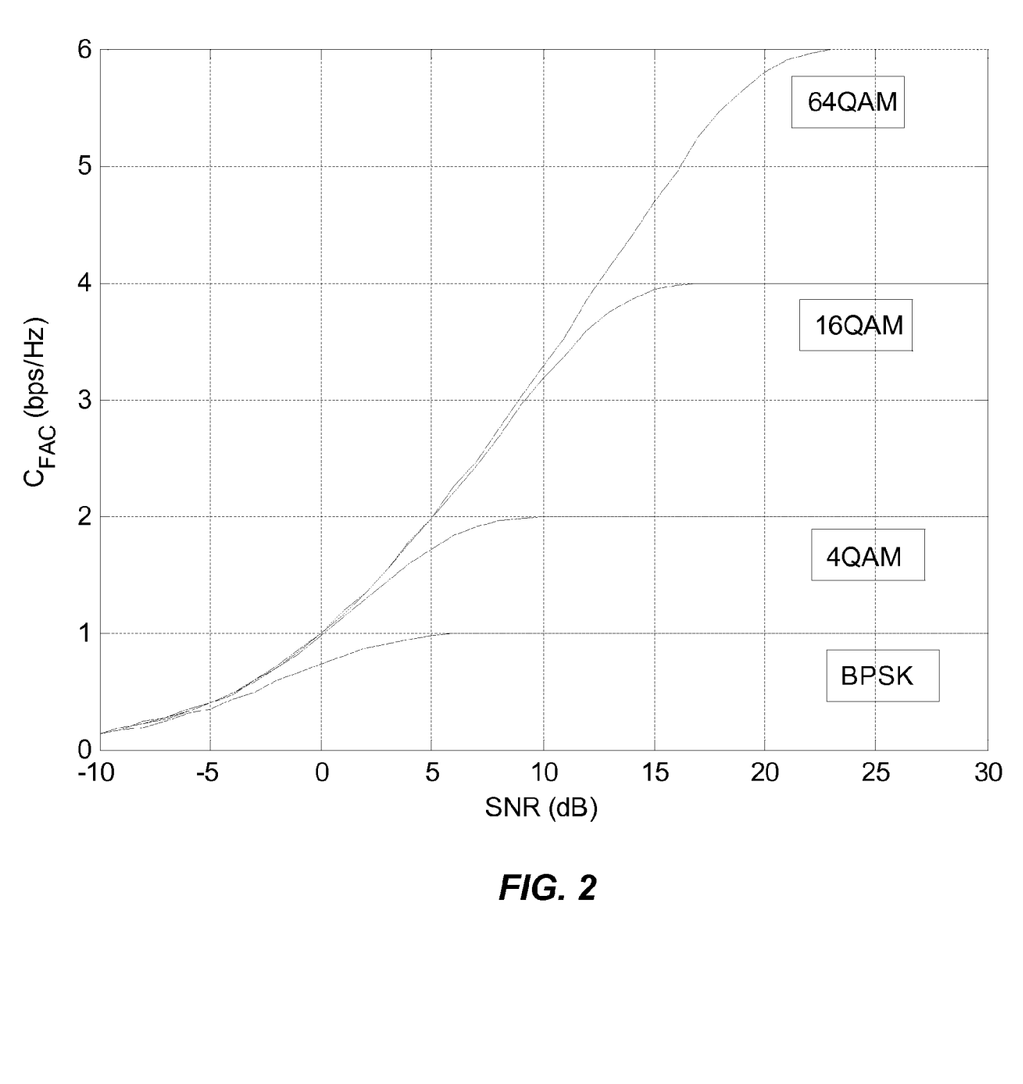
FIG. 2 is a graph of determined finite alphabet capacity (FAC) values for a plurality of modulation schemes.

In any case, FAC values for various modulation schemes and SNR values may be empirically determined in a variety of ways. As just one example, FAC values may be empirically determined through simulation, such as Monte-Carlo simulation. As another example, FAC values may be empirically determined through experimentation. Once FAC values for various modulation schemes and SNR values have been determined, tables of quantized FAC values may be generated as a function of SNR. FIG. 2 is a graph illustrating determined FAC values for a plurality of modulation schemes (binary phase shift keying (BPSK, 4-QAM, 16-QAM, and 64-QAM) versus SNR. As can be seen in FIG. 2, the FAC values corresponding to each modulation scheme in the graph are upper-bounded by $\log_2 M$. The area in which the quantized FAC values reach a maximum may be referred to as saturation. Thus, in creating the tables as mentioned above, each table may have a range that begins at some minimum SNR value and ends at a maximum SNR value corresponding to saturation.

Optionally, if it is not practical or desired to empirically determine FAC values and/or to provide storage for the tables discussed above, an estimate of an FAC may instead be calculated. For example, it is known that the so called cut-off rate $R_O$ is always less than or equal to $C_{FAC}$:

$$R_0 = \log_2 M - \log_2\left\{\sum_Z E_{X,Y}\left(\sqrt{\frac{P(Y/Z)}{p(Y/X)}}\right)\right\} \quad \text{(Equation 7)}$$

The cut-off rate $R_O$ can be calculated analytically. Also, the cut-off rate $R_O$ generally is a good approximation of $C_{FAC}$ for QAM.

In the discussion above, FAC was described in the context of a SISO channel. FAC in the context of a MIMO channel utilizing OFDM modulation and precoding (e.g., beamforming) will now be described. In this context, there may N OFDM subchannels as well as Q spatial channels. In other words, each of the N OFDM subchannels may be considered to include Q spatial subchannels. Additionally, it may be assumed that the Q spatial subchannels within each OFDM subchannel are parallel subchannels. For example, with singular value decomposition (SVD) beamforming, the Q spatial subchannels within each OFDM subchannel are truly parallel. As another example, if the receiver utilizes a linear equalizer, the Q spatial subchannels within each OFDM subchannel may be considered parallel for other types of beamforming. Thus, each of the Q spatial subchannels within each OFDM subchannel may be treated as a SISO channel. Further, once the subchannel SNRs have been determined, each of the Q spatial subchannels within each OFDM subchannel may be considered an AWGN channel, effectively.

Thus, each of the Q spatial subchannels within each OFDM subchannel may be associated with a corresponding FAC. An aggregate FAC per subchannel (space and frequency) may be determined. As just one example, the aggregate FAC ($C_{FAC, TxBF}$) across all OFDM and spatial subchannels may be determined according to:

$$C_{FAC,TxBF} = \frac{1}{QN} \sum_{i=1}^{Q} \sum_{j=1}^{n} C_{FAC}[i, j] \quad \text{(Equation 8)}$$

where $C_{FAC}[i,j]$ is the FAC associated with the i-th spatial subchannel of the j-th OFDM subchannel.

Under ideal encoding/decoding, a packet will be in error if the transmission rate exceeds the FAC. Put another way, the packet will be in error if the FAC is less than the transmission rate. For an OFDM system, the transmission rate per spatial stream (R) for a given MCS may be determined according to:

$$R = r \log_2 M \quad \text{(Equation 9)}$$

where r is the convolution code (CC) rate corresponding to the MCS. For example, for an MCS with 64-QAM and CC rate of ¾, the transmission rate is 4.5 bps/Hz per spatial stream. Thus, in this example, if the aggregate FAC (Equation 8) is less than 4.5 bps/Hz per spatial stream, a packet transmitted according to this MCS will be in error.

But in practical implementations with non-ideal codes and receivers, packets will be in error if the transmission rate exceeds a level that is even less than the FAC. Put another way, the packet will be in error if the FAC is less than a level that is above the transmission rate R. In other words, practical systems will operate at a gap below the ideal capacity. Thus, the FAC for a given MCS may be compared to some operating threshold that is above the transmission rate R for the MCS. If the FAC for a given MCS exceeds the corresponding operating threshold, then the MCS may be determined to be an acceptable MCS. Operating thresholds for the various MCSs may be determined or set in a variety of ways. For example, the operating thresholds may be determined or set based on particular design choices. For example, operating thresholds may be chosen for a particular implementation based on a chosen level of MCS selection aggressiveness for the implementation. MCS selection generally becomes more aggressive as the operating threshold moves closer to the transmission rate R. On the other hand, MCS selection generally becomes more conservative as the operating threshold moves away from the transmission rate R.

As one example implementation (which is a conservative implementation), the operating thresholds may be chosen as $\log_2 M$. In this example implementation, the operating thresholds for all MCSs with 64-QAM, for example, will be six no matter which CC rate is utilized. In this implementation, if the FAC is equal to $\log_2 M$, any MCS with M-ary modulation will be received without errors. Thus, the MCS with the highest code rate can be selected.

Another example implementation (which is more aggressive than the previously-described implementation) corresponds to the operating thresholds set forth in Table 1.

TABLE 1

| Modulation | CC Rate | Operating Threshold |
|---|---|---|
| BPSK | ½ | 0.98 |
| 4-QAM | ½ | 1.94 |
| 4-QAM | ¾ | 1.99 |
| 16-QAM | ½ | 3.6 |
| 16-QAM | ¾ | 3.92 |
| 64-QAM | ⅔ | 5.8 |
| 64-QAM | ¾ | 5.9 |
| 64-QAM | ⅚ | 5.95 |

The information in Table 1 corresponds to merely one specific example implementation. Other implementations may utilize different thresholds, different sets of modulations schemes, and/or different sets of CC rates. For example, as described above, a threshold may be adjusted closer to or farther from R to achieve a different degree of aggressiveness.

Figure 3:
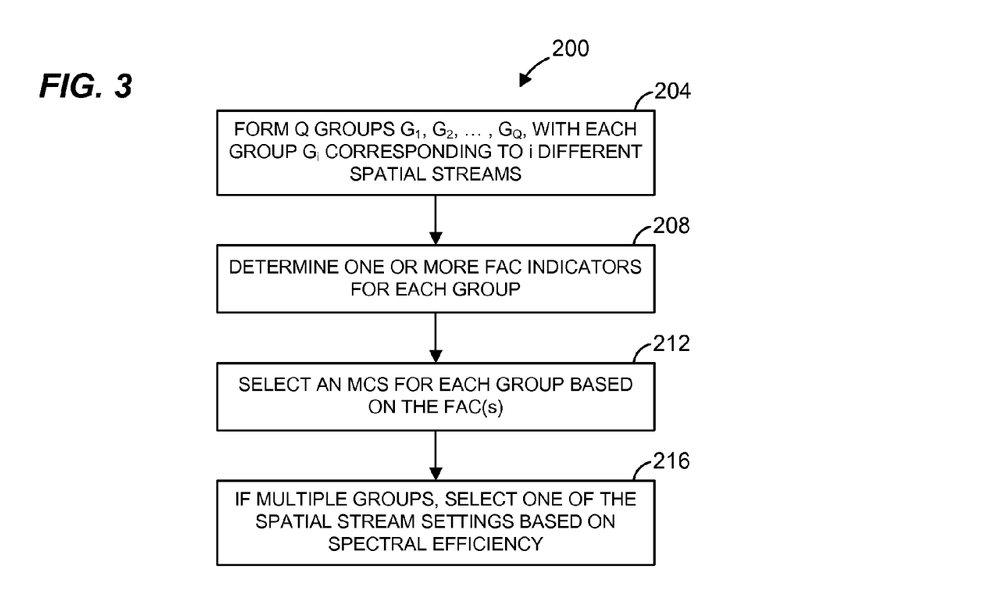
FIG. 3 is a flow diagram of an example method for selecting an MCS and a stream setting for a MIMO communication system that utilizes precoding/beamforming and OFDM modulation.

FIG. 3 is a flow diagram of an example method 200 for selecting an MCS and a stream setting (e.g., a number of spatial streams) for a MIMO communication system that utilizes precoding/beamforming and OFDM modulation. In the method 200, it is assumed that there are N OFDM subchannels, and that the maximum number of available spatial streams is Q. It is also assumed that the SNRs are available for each OFDM subchannel and for each spatial stream setting. For example, for a spatial stream setting of two, the SNRs for each of the N OFDM subchannels in each of the two spatial streams are available.

At a block 204, Q different groups $G_1, G_2, \ldots, G_Q$ may be formed, wherein each group $G_i$ corresponds to a spatial stream setting of i (i.e., the number of spatial streams is i). Each group $G_i$ includes the SNRs for all N OFDM subchannels for each of the spatial channels 1 to i (if i is greater than one). At a block 208, one or more FAC indicators may be determined for each group based on the SNRs. Each determined FAC indicator may correspond to a different modulation scheme, for example.

As described above, determining a FAC indicator may be performed in a variety of ways, such as looking up a FAC value in a table based on an SNR value, calculating an estimate of FAC (such as the cut-off rate $R_O$), etc. As a specific example, the FAC indicator may be an aggregate FAC indicator calculated according to an equation such as Equation 8. In such an implementation, determining the aggregate FAC may include determining N×Q FACS $C_{FAC}[k,j]$ corresponding to the N×Q different SNR values, wherein $C_{FAC}[k,j]$ is the FAC associated with the k-th spatial subchannel of the j-th OFDM subchannel. For instance, each SNR may be utilized to look up a corresponding $C_{FAC}[k,j]$ in a table, or utilized to calculate an estimate of the $C_{FAC}[k,j]$.

At a block 212, an MCS may be selected for each group based on the FAC indicators generated at the bloc 208. For example, at least some of the FAC indicators generated at the block 208 may be compared to operating thresholds corresponding to different MCSs as described above. One or more MCS for which a FAC indicator met the corresponding operating threshold(s) may be considered for the group. Typically, the MCS for which the FAC indicator met the operating threshold and which provides the highest bit rate may be selected as the MCS for the group.

At a block 216, if there are multiple groups (i.e., if i is greater than one) corresponding to multiple spatial stream settings, then one of the spatial stream settings may be selected. For example, the spatial stream setting and corresponding MCS which provides the highest spectral efficiency may be selected.

Figure 4:
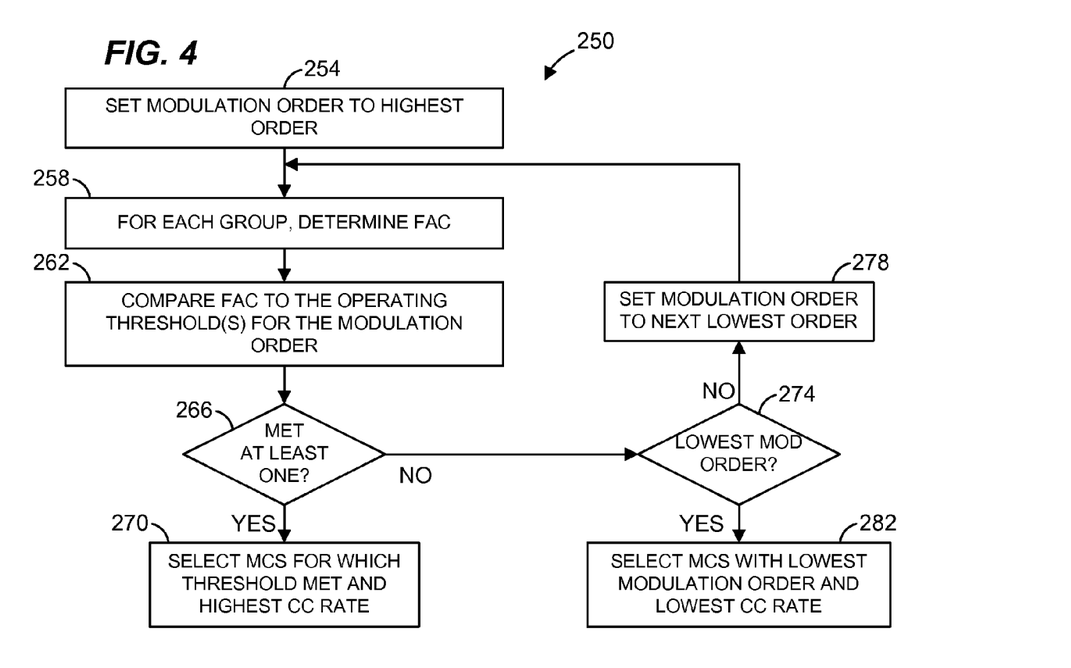
FIG. 4 is a flow diagram of an example method for selecting an MCS for a group of spatial streams.

FIG. 4 is a flow diagram of an example method 250 for selecting an MCS for a group. The method 250 may be utilized to implement the blocks 208 and 212 of FIG. 3 for example. It is to be understood, however, that the method 250 need not be utilized to implement the method 200 of FIG. 3, and that the blocks 208 and 212 of FIG. 3 may be implemented in a variety of ways.

At a block 254, a modulation order may be set to highest level. For an implementation to be used in an IEEE 802.11 standard compliant system, the modulation order may be set to 64, for example. At a block 258, a FAC indicator may be determined for each group. At a block 262, the FAC indicator for each group may be compared to one or more operating thresholds corresponding to the modulation order. For example, if there are multiple possible CC rates for the modulation order, there may be multiple corresponding operating thresholds, and the FAC indicator may be compared to one or more of the thresholds. For example, the FAC indicator may be compared to all of the thresholds. As another example, the comparisons may be done in an order corresponding to CC rates ordered from highest to lowest. In this implementation, if the FAC indicator meets a threshold, then comparisons to other thresholds corresponding to lower CC rates may be omitted.

At a block 266, it may be determined, for each group, if at least one of the thresholds was met. If at least one threshold was met for a group was met, the MCS for that group may be selected at a block 270. For example, the MCS corresponding to the highest CC rate for which the threshold was met may be selected. Then, with respect to that group, the flow may end.

If at the block 266 it is determined that, for one or more groups, no threshold was met, then the flow may proceed to a block 274. At the block 274, it may be determined whether the modulation order is the lowest modulation order. If the modulation order is not the lowest modulation order, then the flow may proceed to the block 278. At the block 278, the modulation order may be set to the next lowest modulation order. Then, the flow may return to the block 258, and the blocks 258, 266, etc., may be repeated with respect to any groups for which an MCS was not already selected at the block 270.

If, at the block 274, it is determined that the modulation order is at the lowest order, then the flow may proceed to a block 282. At the block 282, with respect to any groups for which an MCS was not already selected at the block 270, the MCS may be set to the lowest modulation order and the lowest CC rate.

Figure 5:
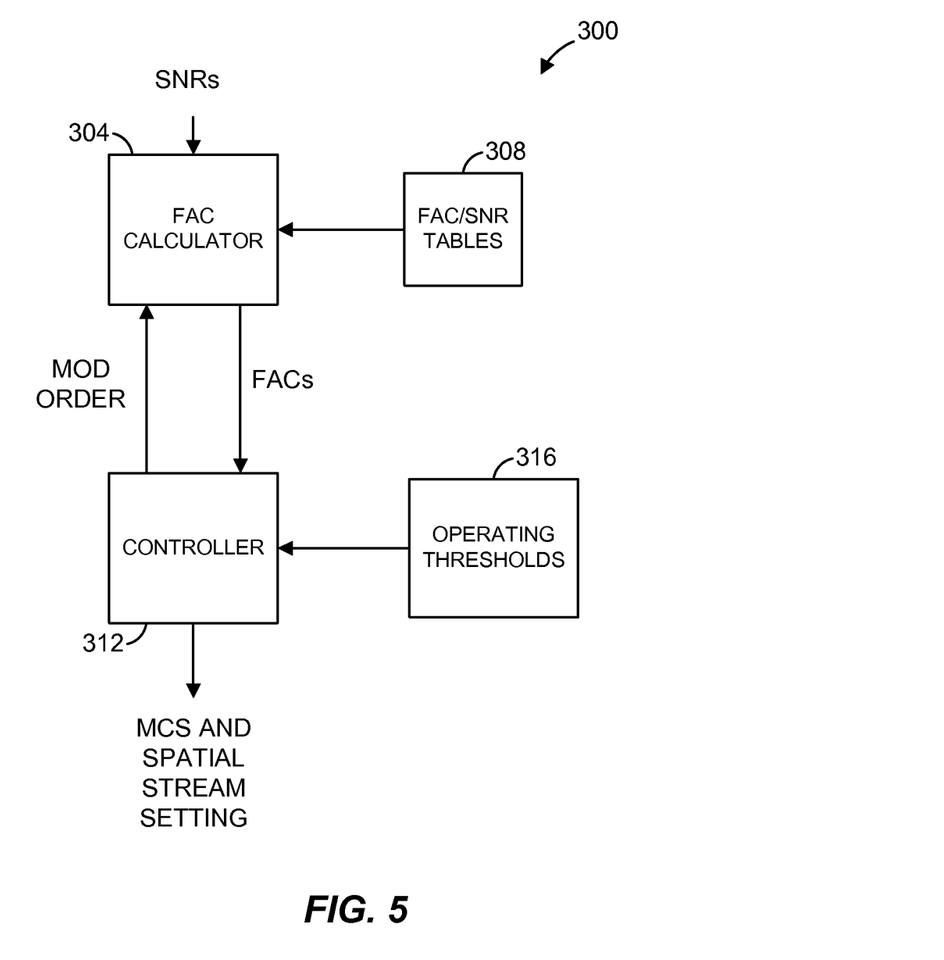
FIG. 5 is a block diagram of an example MCS selection block.

Referring again to FIG. 1, the MCS selection block 28 and/or the MCS selection block 48 optionally may implement the method 200 and/or the method 250. It is to be understood, however, that the MCS selection block 28 and the MCS selection block 48 may implement other methods additionally or alternatively. FIG. 5 is a block diagram of an example MCS selection block 300 that may implement the method 200 and/or the method 250. The MCS selection block 28 and/or the MCS selection block 48 of FIG. 1 optionally may include the example MCS selection block 300 of FIG. 5. It is to be understood, however, that the MCS selection block 28 and the MCS selection block 48 need not include the MCS selection block 300.

The MCS selection block 300 includes an FAC calculator 304 coupled to a memory 308 that stores a plurality of FAC/SNR tables such as described above with reference to FIG. 2, for example. The FAC calculator 304 also may be coupled to a controller 312. The FAC calculator 304 may receive a plurality of SNR values corresponding to all N OFDM subchannels for all of the spatial stream settings. The FAC calculator 304 also may receive an indication of a modulation order from the controller 312. The FAC calculator 304 may calculate FAC indicators such as describe with reference to FIGS. 3 and/or 4. Optionally, the memory 308 may be omitted and the FAC calculator may calculate FAC estimates rather than looking up FAC values in a table.

The controller 312 may receive FACs corresponding to a modulation order and the groups from the FAC calculator 304. The controller 312 may be coupled to a memory 316 that stored operating thresholds. The controller 312 may compare the FACs to the operating thresholds to determine a selected MCS and spatial stream setting such as described above with reference to FIG. 3 and/or FIG. 4. The memory 308 and the memory 316 may be included in a single memory or separate memories. In an alternative implementation, the FAC calculator 304 may be omitted, and the controller 312 may implement the functionality of the FAC calculator 304.

Each of the FAC calculator 304 and the controller 312 may be implemented in hardware, firmware, software, or any combination of hardware, firmware, and/or software. As just one specific implementation, the FAC calculator 304 may be implemented in hardware, whereas the controller 312 may be implemented in software and/or firmware. For example, the controller 312 may include a processor and machine readable instructions that cause the controller 312 to implement methods described above may be stored in a memory associated with the processor.

Although the example methods described above included determining a corresponding FAC for each OFDM subchannel, in other implementations, a corresponding FAC could be determined for each group of a plurality of groups of OFDM subchannels. For example, the OFDM subchannels could be arranged as a plurality of groups of subchannels (where each group includes four adjacent subchannels or any other suitable number of adjacent subchannels). A corresponding FAC could be determined for each of the groups of subchannels based on a single subchannel within the group, for example. In this implementation, an SNR for each of group of subchannels may be determined by or provided to the MCS selection block, as opposed to an SNR for each individual subchannel. More generally, a corresponding FAC could be determined for each set of a plurality of sets of OFDM subchannels, wherein each set may include a single OFDM subchannel or a group of OFDM subchannels.

Although MCS selection techniques were described above in the context of OFDM modulation, similar MCS selection techniques may be utilized with other modulation schemes as well.

Although MCS selection techniques were described above in the context of transmit beamforming, similar MCS techniques can be utilized in other contexts as well. For example, similar techniques may be utilized in determining an MCS in the context of spatial multiplexing and/or transmit diversity (e.g., space-time block codes). Also, similar techniques may be utilized in selecting a transmission scheme from a set of schemes comprising at least spatial multiplexing and transmit diversity. For example, an indication of modulation constrained capacity of a MIMO communication channel may be determined, wherein the indication of modulation constrained capacity corresponds to one of a plurality of transmission schemes (e.g., a spatial multiplexing scheme, a transmit diversity scheme, etc.). The indication of modulation constrained capacity corresponding to the one transmission scheme may be compared to a threshold corresponding to the one transmission scheme. Then, a transmission scheme may be selected from the plurality of transmission schemes based on the comparison of the indication of modulation constrained capacity to the threshold. Referring to FIG. 5, for example, the FAC calculator 304 or the controller 312 (if the FAC calculator 304 is omitted) may determine the indication of modulation constrained capacity. The controller 312 may compare the indication of modulation constrained capacity to a threshold, and select a transmission scheme based on the comparison.

Moreover, in the context of transmit beamforming, the example methods can be readily extended so that MCS and/or spatial stream setting selection can support different spatial streams that utilize different MCSs. Further, although the analysis above treated a MIMO channel as separate SISO channels, the example methods can be readily extended, by one of ordinary skill in the art, so that a MIMO channel is treated as a vector and the FAC is analyzed based on vector calculations. This may be useful with respect to maximum likelihood receivers, for example. Again, a vector-based FAC could be determined using a lookup table technique, or by calculating an estimate of FAC, such as the cut-off rate $R_O$, for example.

MCS selection methods such as those described above may be implemented by an MCS selection block such as the blocks 28, 48 of FIG. 1 and/or the MCS selection block 300 of FIG. 5. These methods may be implemented at least partially in hardware. Portions not implemented in hardware may be implemented in software and/or firmware. Alternatively, the methods may be implemented wholly in software. If any portion is implemented in software, the MCS selection block may include a processor (e.g., a general purpose processor, a special purpose processor such as a digital signal processor, etc.) and a memory coupled to the processor. The memory may store machine readable instructions that cause the processor to implement various portions of the method. The processor may be shared with other components of the communication device.

MCS selection methods such as those described above may be utilized in various MIMO devices. For example, techniques such as described above may be utilized in base stations, access points, wireless routers, etc. Additionally, FIGS. 6A-6F illustrate various devices in which MCS selection techniques such as described above, may be employed.

Figure 6A:
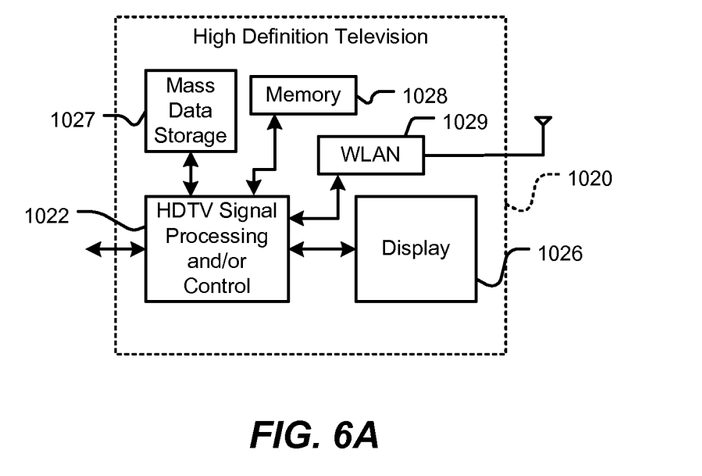
FIG. 6A is a block diagram of a high definition television that may utilize MCS selection techniques such as described herein.

Referring now to FIG. 6A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required. The signal processing and/or control circuit 1022 may implement MCS selection techniques such as described above.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement MCS selection techniques such as described above.

Figure 6B:
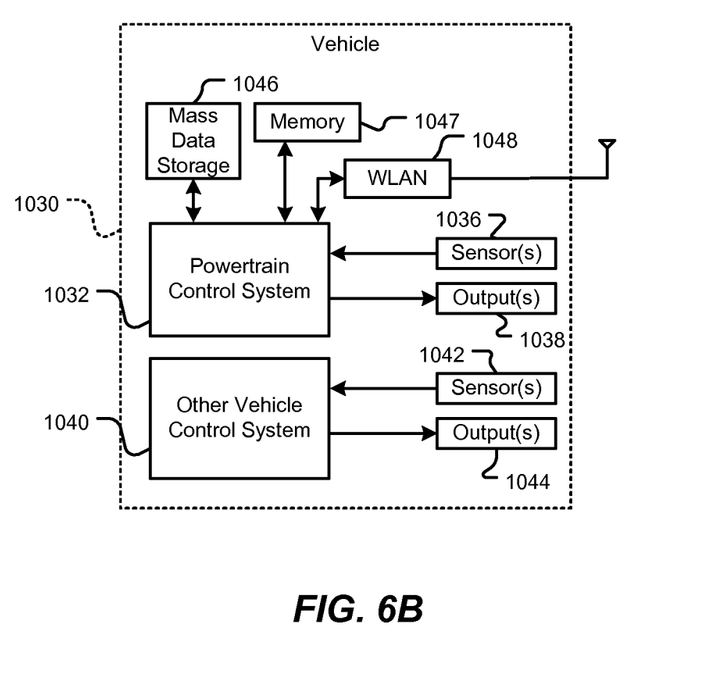
FIG. 6B is a block diagram of a vehicle that may utilize MCS selection techniques such as described herein.

Referring now to FIG. 6B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement MCS selection techniques such as described above.

Figure 6C:
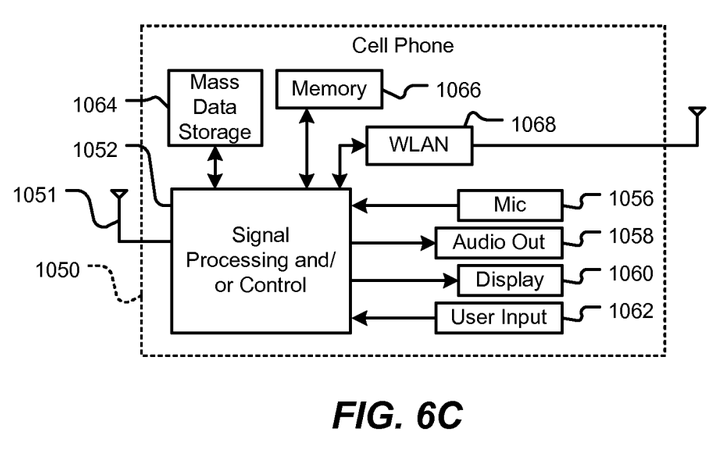
FIG. 6C is a block diagram of a cellular phone that may utilize MCS selection techniques such as described herein.

Referring now to FIG. 6C, such techniques may be used in a cellular phone 1050 that may include a cellular antenna 1051. The cellular phone 1050 may include either or both signal processing and/or control circuits, which are generally identified in FIG. 6C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions. The signal processing and/or control circuits 1052 may implement MCS selection techniques such as described above.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement MCS selection techniques such as described above.

Figure 6D:
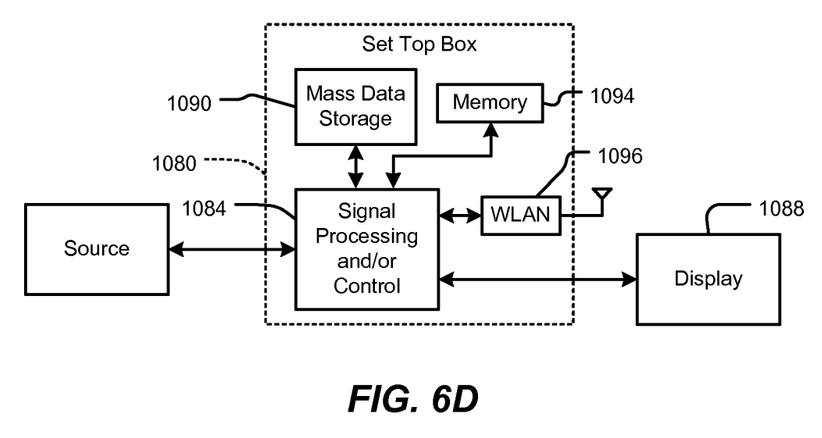
FIG. 6D is a block diagram of a set top box that may utilize MCS selection techniques such as described herein.

Referring now to FIG. 6D, such techniques may be utilized in a set top box 1080. The set top box 1080 may include either or both signal processing and/or control circuits, which are generally identified in FIG. 6D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function. The signal processing and/or control circuits 1084 may implement MCS selection techniques such as described above.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096.

The WLAN network interface 1096 may implement MCS selection techniques such as described above.

Figure 6E:
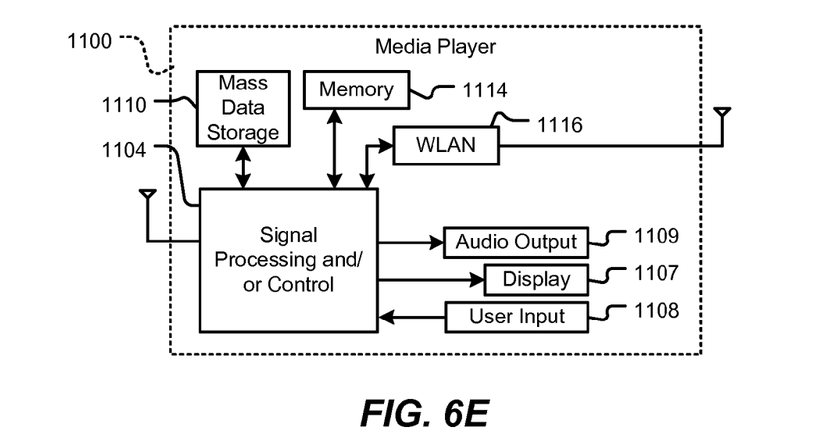
FIG. 6E is a block diagram of a media player that may utilize MCS selection techniques such as described herein.

Referring now to FIG. 6E, such techniques may be used in a media player 1100. The media player 1100 may include either or both signal processing and/or control circuits, which are generally identified in FIG. 6E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement MCS selection techniques such as described above.

Figure 6F:
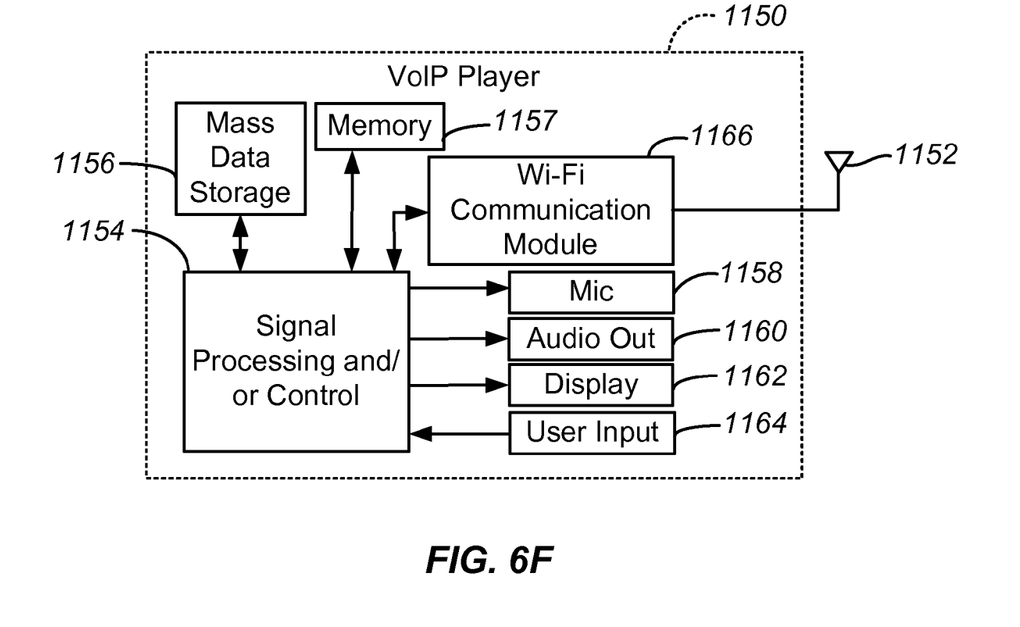
FIG. 6F is a block diagram of a voice over IP device that may utilize MCS selection techniques such as described herein.

Referring to FIG. 6F, such techniques may be utilized in a Voice over Internet Protocol (VoIP) phone 1150 that may include an antenna 1152. The VoIP phone 1150 may include either or both signal processing and/or control circuits, which are generally identified in FIG. 6F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement MCS selection techniques such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A non-transitory computer-readable memory tangibly storing a plurality of instructions that, when executed by one or more processors, cause the one or more processors to:
   determine an indication of modulation constrained capacity of a multiple input multiple output (MIMO) communication channel, wherein the indication of modulation constrained capacity corresponds to one modulation scheme from a plurality of modulation schemes;
   compare the indication of modulation constrained capacity corresponding to the one modulation scheme to two or more thresholds corresponding to the one modulation scheme, wherein each threshold of the two or more thresholds corresponds to a different convolution code rate;
   select one of a plurality of convolution code rates based on the comparison of the indication of modulation constrained capacity to the two or more thresholds; and
   select a modulation scheme from the plurality of modulation schemes based on the comparison of the indication of modulation constrained capacity to at least one of the two or more thresholds.

2. The non-transitory computer-readable memory of claim 1, wherein the plurality of instructions cause the one or more processors to determine the indication of modulation constrained capacity at least in part by utilizing a lookup table including a plurality of modulation constrained capacity values.

3. The non-transitory computer-readable memory of claim 1, wherein the plurality of instructions cause the one or more processors to determine the indication of modulation constrained capacity at least in part by calculating an estimate of the modulation constrained capacity.

4. The non-transitory computer-readable memory of claim 1, wherein the plurality of instructions cause the one or more processors to determine the indication of modulation constrained capacity based on a signal-to-noise ratio (SNR) corresponding to the MIMO communication channel.

5. The non-transitory computer-readable memory of claim 4, wherein each modulation scheme in the plurality of modulation schemes is an orthogonal frequency division multiplexing (OFDM) modulation scheme.

6. The non-transitory computer-readable memory of claim 5, wherein the plurality of instructions cause the one or more processors to determine the indication of modulation constrained capacity based on a plurality of SNRs, wherein each SNR corresponds to a respective set of one or more OFDM subchannels.

7. The non-transitory computer-readable memory of claim 6, wherein:
the plurality of SNRs includes a corresponding SNR for each set of one or more OFDM subchannels and for each of Q spatial channel settings; and
Q is a positive integer.

8. The non-transitory computer-readable memory of claim 7, wherein the plurality of instructions cause the one or more processors to determine the indication of modulation constrained capacity at least in part by determining an aggregate modulation constrained capacity indicator based on the plurality of SNRs.

9. The non-transitory computer-readable memory of claim 1, wherein the plurality of instructions, when executed by the one or more processors, cause the one or more processors to:
select one of a plurality of spatial stream settings based on the comparison of the indication of modulation constrained capacity to at least one of the two or more thresholds.

10. The non-transitory computer-readable memory of claim 1, wherein the plurality of instructions, when executed by the one or more processors, cause the one or more processors to:
select one scheme from a set of MIMO transmission schemes based on the comparison of the indication of modulation constrained capacity to at least one of the two or more thresholds, wherein the set of MIMO transmission schemes comprises at least a spatial multiplexing scheme and a transmit diversity scheme.

11. A system comprising:
a memory storing a plurality of thresholds corresponding to a plurality of modulation schemes;
a controller configured to
determine an indication of modulation constrained capacity of a multiple input multiple output (MIMO) communication channel, wherein the indication of modulation constrained capacity corresponds to one modulation scheme from the plurality of modulation schemes,
compare the indication of modulation constrained capacity corresponding to the one modulation scheme to two or more thresholds of the stored plurality of thresholds, wherein (i) each threshold of the two or more thresholds corresponds to the one modulation scheme and (ii) each threshold of the two or more thresholds corresponds to a different convolution code rate,
select one of a plurality of convolution code rates based on the comparison of the indication of modulation constrained capacity to the two or more thresholds, and
select a modulation scheme from the plurality of modulation schemes based on the comparison of the indication of modulation constrained capacity to at least one of the two or more thresholds; and
a signal modulator configured to modulate information signals using the selected modulation scheme to produce modulated signals.

12. The system of claim 11, wherein the controller, the signal modulator, and a precoder are included in a transmitter.

13. The system of claim 11, wherein:
the controller is included in a receiver; and
the signal modulator and a precoder are included in a transmitter.

14. The system of claim 11, wherein the controller is configured to determine the indication of modulation constrained capacity at least in part by utilizing a lookup table including a plurality of modulation constrained capacity values.

15. The system of claim 11, wherein the controller is configured to determine the indication of modulation constrained capacity at least in part by calculating an estimate of the modulation constrained capacity.

16. The system of claim 11, wherein the controller is configured to determine the indication of modulation constrained capacity based on a signal-to-noise ratio (SNR) corresponding to the MIMO communication channel.

17. The system of claim 11, wherein each modulation scheme in the plurality of modulation schemes is an orthogonal frequency division multiplexing (OFDM) modulation scheme.

18. The system of claim 17, wherein:
the controller is configured to determine the indication of modulation constrained capacity based on a plurality of SNRs; and
each SNR corresponds to a respective set of one or more OFDM subchannels.

19. The system of claim 18, wherein:
the plurality of SNRs includes a corresponding SNR for each set of one or more OFDM subchannels and for each of Q spatial channel settings; and
Q is a positive integer.

20. The system of claim 19, wherein the controller is configured to determine the indication of modulation constrained capacity at least in part by determining an aggregate modulation constrained capacity indicator based on the plurality of SNRs.

21. The system of claim 11, wherein the controller is configured to:
select one of a plurality of spatial stream settings based on the comparison of the indication of modulation constrained capacity to at least one of the two or more thresholds.

22. The system of claim 11, wherein the controller is configured to:
select one scheme from a set of MIMO transmission schemes based on the comparison of the indication of modulation constrained capacity to at least one of the two or more thresholds, wherein the set of MIMO transmission schemes comprises at least a spatial multiplexing scheme and a transmit diversity scheme.

23. The system of claim 11, further comprising:
a precoder configured to precode the modulated signals to produce a plurality of output signals to be provided to a plurality of transmit antennas.

24. A non-transitory computer-readable memory tangibly storing a plurality of instructions that, when executed by one or more processors, cause the one or more processors to:
- determine an indication of modulation constrained capacity of a multiple input multiple output (MIMO) communication channel, wherein the indication of modulation constrained capacity corresponds to one modulation scheme from a plurality of modulation schemes;
- compare the indication of modulation constrained capacity corresponding to the one modulation scheme to a threshold corresponding to the one modulation scheme;
- select one of a plurality of spatial stream settings based on the comparison of the indication of modulation constrained capacity to the threshold; and
- select a modulation scheme from the plurality of modulation schemes based on the comparison of the indication of modulation constrained capacity to the threshold.

25. A non-transitory computer-readable memory tangibly storing a plurality of instructions that, when executed by one or more processors, cause the one or more processors to:
- determine an indication of modulation constrained capacity of a multiple input multiple output (MIMO) communication channel, wherein the indication of modulation constrained capacity corresponds to one modulation scheme from a plurality of modulation schemes;
- compare the indication of modulation constrained capacity corresponding to the one modulation scheme to a threshold corresponding to the one modulation scheme;
- select one scheme from a set of MIMO transmission schemes based on the comparison of the indication of modulation constrained capacity to the threshold, wherein the set of MIMO transmission schemes comprises at least a spatial multiplexing scheme and a transmit diversity scheme; and
- select a modulation scheme from the plurality of modulation schemes based on the comparison of the indication of modulation constrained capacity to the threshold.

26. A system comprising:
a memory storing a plurality of thresholds corresponding to a plurality of modulation schemes;
a controller configured to
- determine an indication of modulation constrained capacity of a multiple input multiple output (MIMO) communication channel, wherein the indication of modulation constrained capacity corresponds to one modulation scheme from the plurality of modulation schemes,
- compare the indication of modulation constrained capacity corresponding to the one modulation scheme to a threshold of the stored plurality of thresholds, wherein the threshold corresponds to the one modulation scheme,
- select one of a plurality of spatial stream settings based on the comparison of the indication of modulation constrained capacity to the threshold, and
- select a modulation scheme from the plurality of modulation schemes based on the comparison of the indication of modulation constrained capacity to the threshold; and
a signal modulator configured to modulate information signals using the selected modulation scheme to produce modulated signals.

27. A system comprising:
a memory storing a plurality of thresholds corresponding to a plurality of modulation schemes;
a controller configured to
- determine an indication of modulation constrained capacity of a multiple input multiple output (MIMO) communication channel, wherein the indication of modulation constrained capacity corresponds to one modulation scheme from the plurality of modulation schemes,
- compare the indication of modulation constrained capacity corresponding to the one modulation scheme to a threshold of the stored plurality of thresholds, wherein the threshold corresponds to the one modulation scheme,
- select one scheme from a set of MIMO transmission schemes based on the comparison of the indication of modulation constrained capacity to the threshold, wherein the set of MIMO transmission schemes comprises at least a spatial multiplexing scheme and a transmit diversity scheme, and
- select a modulation scheme from the plurality of modulation schemes based on the comparison of the indication of modulation constrained capacity to the threshold; and
a signal modulator configured to modulate information signals using the selected modulation scheme to produce modulated signals.

\* \* \* \* \*